(12) United States Patent
Liu

(10) Patent No.: US 8,769,326 B2
(45) Date of Patent: Jul. 1, 2014

(54) COMPUTER SYSTEM AND OPERATION METHOD FOR CHANGING OPERATION STATE BY CAPACITIVE BUTTON GROUP

(75) Inventor: Li-Wei Liu, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 313 days.

(21) Appl. No.: 13/283,101

(22) Filed: Oct. 27, 2011

(65) Prior Publication Data

US 2012/0233483 A1      Sep. 13, 2012

(30) Foreign Application Priority Data

Mar. 7, 2011   (TW) .............................. 100107625 A

(51) Int. Cl.
*G06F 1/00*      (2006.01)
*G06F 1/32*      (2006.01)

(52) U.S. Cl.
CPC ..................................... *G06F 1/3203* (2013.01)
USPC ........................... 713/324; 713/323; 713/330

(58) Field of Classification Search
USPC ........................... 713/300–340; 710/300–304
See application file for complete search history.

(56) References Cited

U.S. PATENT DOCUMENTS

| | | | |
|---|---|---|---|
| 7,890,778 B2 * | 2/2011 | Jobs et al. ...................... | 713/300 |
| 7,917,783 B2 * | 3/2011 | Luo et al. ...................... | 713/310 |
| 8,072,230 B1 * | 12/2011 | Seguine ......................... | 324/672 |
| 8,395,589 B2 * | 3/2013 | Wisniewski ................... | 345/173 |
| 2006/0145885 A1 * | 7/2006 | Goulis et al. ............... | 340/691.6 |
| 2009/0114456 A1 * | 5/2009 | Wisniewski ............... | 178/18.03 |
| 2011/0157029 A1 * | 6/2011 | Tseng ........................... | 345/173 |
| 2012/0013293 A1 * | 1/2012 | Chu .............................. | 320/108 |

\* cited by examiner

*Primary Examiner* — Raymond Phan
(74) *Attorney, Agent, or Firm* — Rabin & Berdo, P.C.

(57) ABSTRACT

An operation method for a computer system includes: a capacitance button controller detecting whether a capacitance button group is touched; if a capacitance power button of the capacitance button group is touched, a system platform receiving a power button signal in a first logic state and changing an operation state of the system platform; if the capacitance power button is touched for longer than a predetermined time, shutting down the system platform; if the capacitance power button is touched for not longer than the predetermined time, the system platform receiving the power button signal in a second logic state and determining a subsequent operation status of the system platform and the capacitance button controller based on a system status signal; and if the capacitance button group is touched but the capacitance power button is not touched, the capacitance button controller entering into a power-saving state.

12 Claims, 4 Drawing Sheets

COMPUTER SYSTEM AND OPERATION METHOD FOR CHANGING OPERATION STATE BY CAPACITIVE BUTTON GROUP

This application claims the benefit of Taiwan application Serial No. 100107625, filed Mar. 7, 2011, the subject matter of which is incorporated herein by reference.

TECHNICAL FIELD

The disclosure relates in general to a computer system and an operation method applicable thereto, and more particularly to a computer system and an operation method applicable thereto, which detects whether a capacitive power button is pressed and performs related power control.

BACKGROUND

Capacitive buttons have many advantages and have gradually replaced the conventional mechanic buttons. Capacitive buttons are now widely used in various computer systems such as PC, notebook computer or all-in-one PC (AIO PC).

When an object (such as a user's finger) touches the capacitive button, the capacitance of the capacitive button is changed and an internal controller of the computer system detects this to perform various system control functions. Furthermore, tens of conventional mechanic buttons may be replaced by capacitive buttons.

Currently, the power button still mainly uses the conventional mechanic button. For the power button to be implemented by the capacitive button, a suitable processing flow is required to perform functions such as powering on, power off, shutting down, and sleep state.

BRIEF SUMMARY OF THE DISCLOSURE

The disclosure is directed to a computer system and operation method applicable thereto. An operation state of the system is controlled or changed by detecting whether the capacitive power button is touched or not.

An operation method for a computer system is provided in an embodiment of the disclosure. Whether a capacitive button group is touched is detected by a capacitive button controller. A power button signal in a first logic state is received by a system platform whereby an operation state of the system platform is changed if a capacitive power button of the capacitive button group is touched. The system platform is shut down if the capacitive power button is touched for longer than a predetermined time. The power button signal in a second logic state is received by the system platform whereby a subsequent operation state of the system platform and the capacitive button controller is determined according to a system status signal if the capacitive power button is touched for not longer than the predetermined time. The capacitive button controller enters a power saving state if the capacitive button group is touched but the capacitive power button is not touched.

A computer system is provided in an alternative embodiment of the disclosure. The computer system includes: a capacitive button controller for detecting whether a capacitive button group is touched and a system platform coupled to the capacitive button controller. If the capacitive button controller detects that a capacitive power button of the capacitive button group is touched, then a system platform receives a power button signal in a first logic state and changes an operation state of the system platform. If the capacitive power button is touched for longer than a predetermined time, then the system platform is shut down. If the capacitive power button is touched for not longer than the predetermined time, then the system platform receives the power button signal in a second logic state, and determines a subsequent operation state of the system platform and the capacitive button controller according to a system status signal. If the capacitive button group is touched but the capacitive power button is not touched, then the capacitive button controller enters the power saving state.

It is to be understood that both the foregoing general description and the following detailed description are exemplary and explanatory only and are not restrictive of the disclosed embodiments, as claimed.

DETAILED DESCRIPTION OF THE DISCLOSURE

In an embodiment of the disclosure, the operation state of the system is controlled by detecting whether the capacitive power button of the capacitive button group is touched.

First Embodiment

Figure 1A:
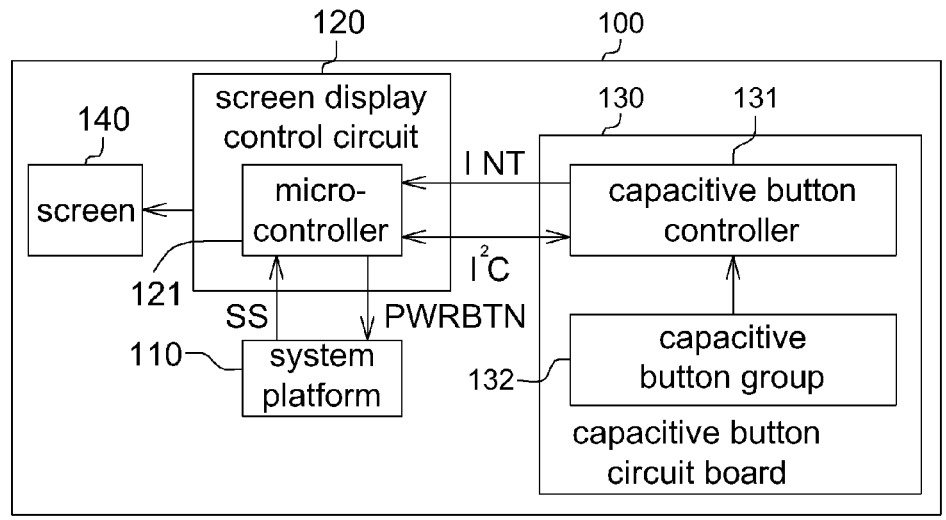
FIG. 1A shows a system function block diagram according to a first embodiment of the disclosure.

Referring to FIG. 1A, a system function block diagram according to a first embodiment of the disclosure is shown. Examples of the system to which the embodiments of the disclosure are applicable include but are not limited to PC, notebook computer or all-in-one PC. The system 100 includes a system platform 110, a screen display control circuit 120, a capacitive button circuit board 130 and a screen 140. The screen 140 is such as but is not limited to an LCD. The screen display control circuit 120 includes a micro-controller 121. The capacitive button circuit board 130 includes a capacitive button controller 131 and a capacitive button group 132.

The system platform 110 is such as an X86 system platform or non-X86 system platform. In general, the system platform 110 such as includes a CPU, a memory, a hard disc, a chip set and so on, but is not limited thereto. The system platform 110 sends a system status signal SS to the micro-controller 121 of the screen display control circuit 120.

The screen display control circuit 120 sends image signals to the screen 140 for displaying images. The micro-controller 121 is coupled to the system platform 110 and the capacitive button controller 131. The micro-controller 121 sends a power button signal PWRBTN to the system platform 110, and receives a system status signal SS from the system platform 110. The micro-controller 121 receives an interrupt signal INT from the capacitive button controller 131. Also, the communication between the micro-controller 121 and the capacitive button controller 131 is implemented through an I²C communication interface. For example, the micro-controller 121 reads/writes an internal register (not illustrated) of the capacitive button controller 131 through the I²C communication interface.

The capacitive button group 132 includes at least a capacitive power button, or further includes such as a capacitive volume control button, a capacitive play button, a capacitive pause button and so on.

In the present embodiment of the disclosure, the capacitive button group 132 at least includes a capacitive power button. When the capacitive button group 132 is pressed, the capacitive button controller 131 sends an interrupt signal INT to the micro-controller 121. The micro-controller 121 identifies which capacitive button is pressed by reading values of internal registers of the capacitive button controller 131, and performs a corresponding operation. Besides, the micro-controller 121 further controls the capacitive button controller 131 to enter the sleep state to save power consumption.

In greater details, when the system platform 110 is in a sleep state, if the capacitive power button is touched, this implies that the user may intend to operate the system 100. In the present embodiment of the disclosure, the capacitive button controller 131 sends the interrupt signal INT to the micro-controller 121; and the micro-controller 121 determines whether the capacitive power button is pressed by reading the values of the internal registers of the capacitive button controller 131. If so, then the micro-controller 121 performs a corresponding operation.

In FIG. 1A, the capacitive button group 132 is formed in the capacitive button circuit board 130. However, in other implementations, the capacitive button group 132 may also be formed outside the capacitive button circuit board 130, and the disclosure is not limited thereto. The micro-controller 121 is disposed in the screen display control circuit 120. However, in other implementations, the micro-controller 121 may also be disposed in other circuits, and the disclosure is not limited thereto.

Figure 1B:
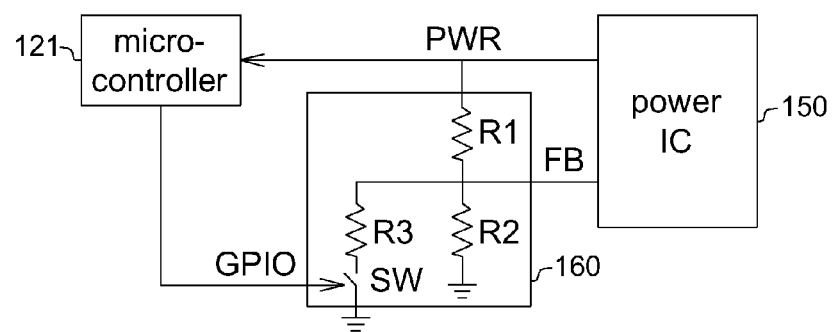
FIG. 1B is a flowchart showing how a micro-controller enters the sleep mode to reduce power consumption according to the first embodiment of the disclosure.

FIG. 1B is a flowchart showing how the micro-controller 121 enters the sleep mode to reduce power consumption according to the first embodiment of the disclosure. As indicated in FIG. 1B, when the micro-controller 121 is in a normal operation state, the micro-controller 121 outputs a logic 0 signal GPIO, so that the switch SW of the divider circuit 160 is disconnected. Thus, the resistors R1 and R2 of the divider circuit 160 divide the power signal PWR to generate a feedback signal FB. When the micro-controller 121 intends to enter the sleep state, the micro-controller 121 outputs a logic 1 signal GPIO, so that the switch SW of the divider circuit 160 is in a conducted state. Thus, the feedback signal FB is generated from dividing the power signal PWR by the resistors R1, R2 and R3 of the divider circuit 160. Consequently, the feedback signal FB is changed. In response to the feedback signal FB, the power IC 150 determines the level of the power signal PWR to control the micro-controller 121 in a normal operation state or a sleep state.

The normal operating voltage of the micro-controller 121 such as ranges between 3.3V~3.0V. When the micro-controller 121 is in normal operation state, the micro-controller 121 outputs a logic 0 signal GPIO to control the voltage division of the divider circuit 160 and to determine the level of the feedback signal FB, so that the power IC 150 outputs a 3.3V power signal PWR to the micro-controller 121. On the other hand, when the micro-controller 121 intends to enter the sleep state, the micro-controller 121 outputs a logic 1 signal GPIO to control the voltage division of the divider circuit 160 and to determine the level of the feedback signal FB, so that the power IC 150 outputs a 3.0V power signal PWR to the micro-controller 121. Consequently, the micro-controller 121 enters the sleep state to reduce power consumption.

The present embodiment of the disclosure may achieve at least one, all or any combination of the following implementations. By touching the capacitive power button, the system may be started from S5 (power off state) to enter the normal operation state. Or, by operating such as a mouse, the system may enter into any of S3 (sleep state), S4 (hibernate state) and S5 (power off state) from a power on state. Or, by touching the capacitive power button, the system may enter into any of S3 (sleep state), S4 (hibernate state) and S5 (power off state) from a power on state. Or, by touching the capacitive power button, the system may be woken up to enter into the power on state from S3 (sleep state) or S4 (hibernate state). Or, by triggering other wake up event (not touching the capacitive power button), the system may be woken up to enter into the power on state from S3 (sleep state) or S4 (hibernate state). Or, by touching the capacitive power button for longer than a predetermined time (such as but is not limited to 4 seconds), the system may be shut down. For convenience of elaboration, S3 (sleep state), S4 (hibernate state) and S5 (power off state) are referred as the power saving state.

Figure 2:
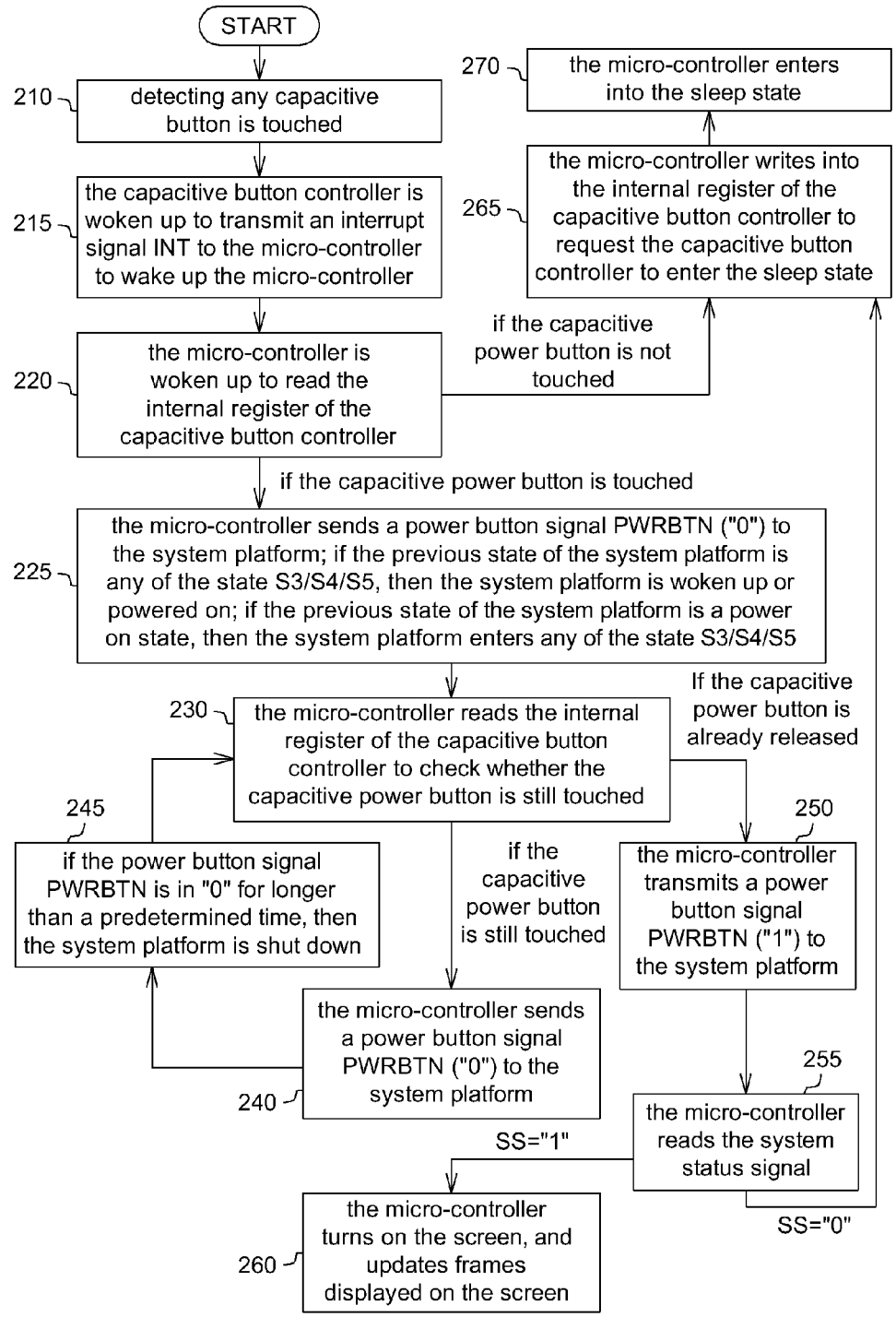
FIG. 2 shows an operating flowing according to the first embodiment of the disclosure.

Referring to FIG. 2, an operating flowing according to the first embodiment of the disclosure to illustrate how the first embodiment achieves at least a or all or any combination of the above functions.

As indicated in FIG. 2, in step 210, whether any capacitive button is touched is detected, and if any one capacitive button is touched, then the flow proceeds to step 215.

In step 215, when any capacitive button is touched, the capacitive button controller in a sleep state is woken up, and writes the internal register(s) of the capacitive button controller based on which capacitive button is touched, and the interrupt signal INT is sent from the capacitive button controller to the micro-controller to wake up the micro-controller.

Two possible implementations for waking up the capacitive button controller are exemplified below, but the disclosure is not limited thereto. In the first implementation, when the capacitive button controller is in a sleep state, if any capacitive button is touched, then the capacitive button controller is woken up to send the interrupt signal INT.

In the second implementation, when the capacitive button controller is in a sleep state, an internal timer of the capacitive button controller is still in a normal operation state. When the set time of the internal timer is up, the capacitive button controller is automatically woken up to detect whether a capacitive button is touched. If so, then the capacitive button controller sends the interrupt signal INT and writes to the internal register(s) of the capacitive button controller. If no, then the capacitive button controller enters the sleep state and the internal timer is reset for timing.

In step 220, the micro-controller, after having been woken up, reads the internal register(s) of the capacitive button controller to identify which capacitive button is touched. If the capacitive power button is not touched, then the flow proceeds to step 265. If the capacitive power button is touched, then the flow proceeds to step 225.

In step 225, if the micro-controller determines that the capacitive power button is touched, then the micro-controller sends a logic 0 power button signal PWRBTN to the system platform. In response to the logic 0 power button signal PWRBTN, if the previous state of the system platform is any of S3 (sleep state), S4 (hibernate state) and S5 (power off state), then the system platform is woken up or powered on. In response to the logic 0 power button signal PWRBTN, if the previous state of the system platform is a power on state, then the system platform enters into any of S3 (sleep state), S4 (hibernate state) and S5 (power off state), for example according to the setting of the operating system.

In step 230, the micro-controller reads the internal register (s) of the capacitive button controller to check whether the capacitive power button is still touched. If the capacitive power button is released, this implies that the user does not intend to shut down the system, and the flow proceeds to step 250. If the capacitive power button is still touched, then the micro-controller keeps sending a logic 0 power button signal PWRBTN to the system platform as indicated in step 240.

In step 245, if the power button signal PWRBTN is in logic 0 state for longer than a predetermined time (such as 4 seconds), that is, the capacitive power button is touched for longer than a predetermined time, then the system platform is shut down.

In step 250, if the capacitive power button is already released, this implies that the user does not intend to shut down the system, so the micro-controller sends a logic 1 power button signal PWRBTN to the system platform.

In step 255, the micro-controller reads the system status signal SS from the system platform. If the system status signal SS is logic 0, this implies that the system platform enters one of S3 (sleep state)/S4 (hibernate state)/S5 (power off state). So the micro-controller writes into the internal register(s) of the capacitive button controller to request the capacitive button controller to enter the sleep state (step 265), and the micro-controller to enter the sleep state (step 270).

To the contrary, if the system status signal SS is logic 1, this implies that the system platform enters the normal operation state, so the micro-controller turns on the screen power, and updates the frame displayed on the screen (step 260).

As indicated in the above disclosure, in the first embodiment, the subsequent operation state of the system platform is determined by detecting whether the capacitive power button is pressed and whether the duration is longer than the predetermined time.

Second Embodiment

Figure 3:
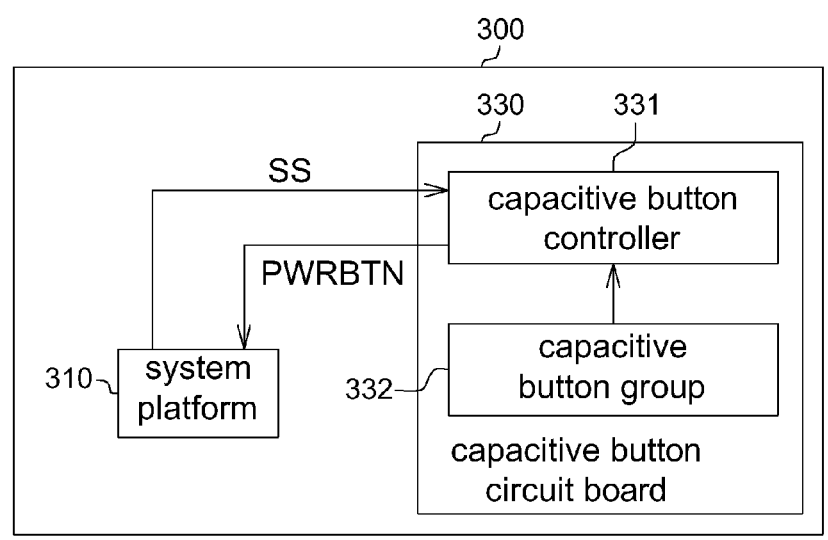
FIG. 3 shows a system function block diagram according a second embodiment of to the disclosure.

Referring to FIG. 3, a system function block diagram according a second embodiment of to the disclosure is shown. The system 300 includes a system platform 310 and a capacitive button circuit board 330. The capacitive button circuit board 330 includes a capacitive button controller 331 and a capacitive button group 332. The system platform 310 and the capacitive button group 332 may be identical or similar to the system platform 110 and the capacitive button group 132 of the first embodiment, and the similarities are not repeated here.

In the second embodiment, the capacitive button controller 331 reads a system status signal SS from the system platform 310. If the system status signal SS is logic 1, this implies that system is in a power on state. Exemplarily but not restrictively, if the system status signal SS is logic 0, this implies that system is not in a power on state, that is, the system may be in any of S3 (sleep state)/S4 (hibernate state)/S5 (power off state).

Moreover, the capacitive button controller 331 detects whether the capacitive power button of the capacitive button group 332 is pressed, to determine the level of the power button signal PWRBTN from the capacitive button controller 331. Exemplarily but not restrictively, if the capacitive power button is pressed, then the power button signal PWRBTN is logic 0. Otherwise, if the capacitive power button is not pressed, then the power button signal PWRBTN is logic 1. The power button signal PWRBTN is transmitted to the system platform 310.

Figure 4:
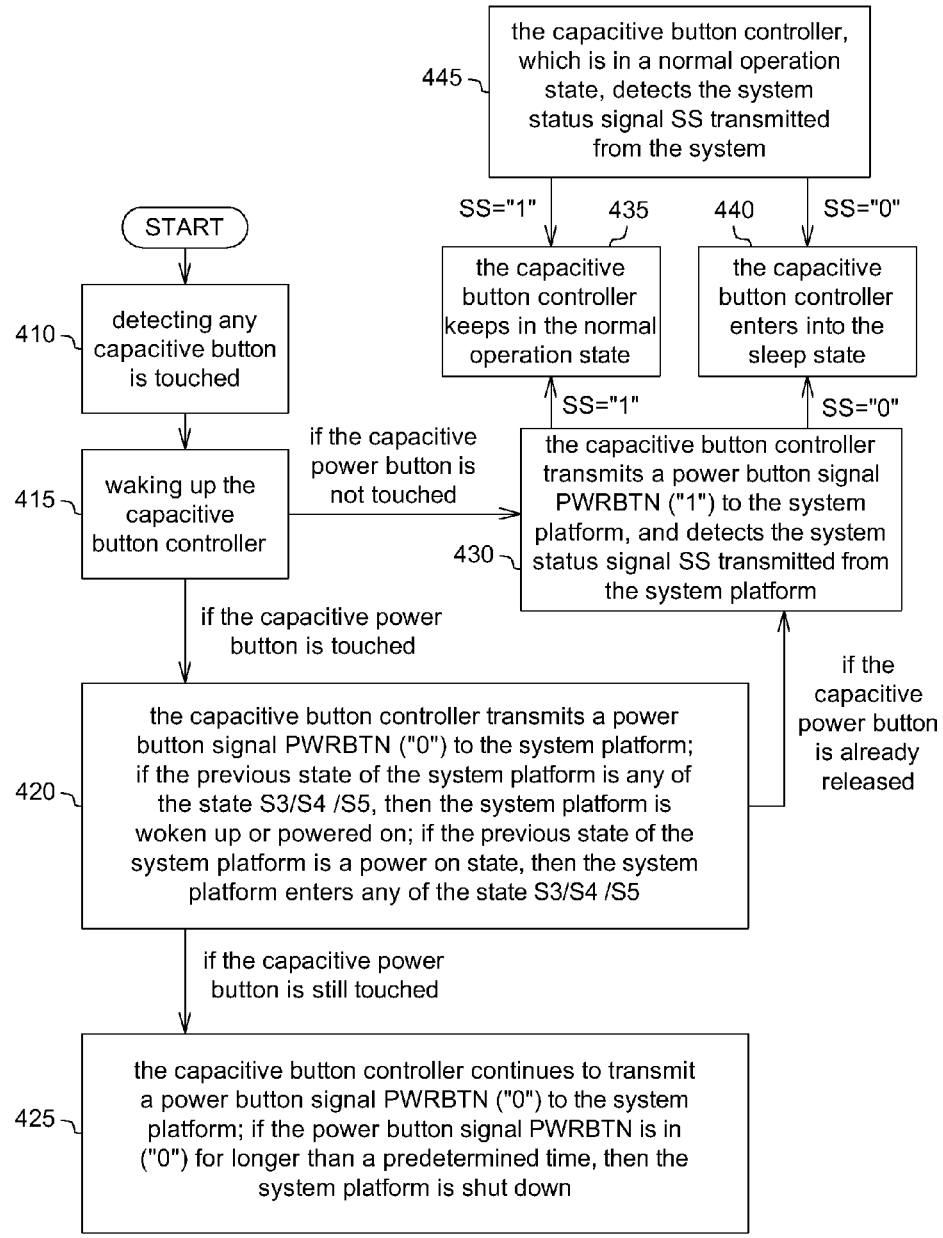
FIG. 4 shows an operating flowing according to the second embodiment of the disclosure.

Referring to FIG. 4, an operating flowing according to the second embodiment of the disclosure is shown. As indicated in FIG. 4, in step 410, if any capacitive button is touched, then the flow proceeds to step 415.

In step 415, when any capacitive button is touched, the capacitive button controller is woken up from a sleep state. Two implementations of the second embodiment for waking up the capacitive button controller are exemplified below, but the disclosure is not limited thereto. In the first implementation, when the capacitive button controller is in the sleep state, if any capacitive button is touched, then the capacitive button controller is woken up. If the capacitive power button is touched, then the capacitive button controller sends a logic 0 power button signal PWRBTN to the system platform.

In the second implementation, when the capacitive button controller is in the sleep state, the internal timer of the capacitive button controller is still in a normal operation state. When the set time of the internal timer is up, the capacitive button controller is automatically woken up to detect whether a capacitive button is touched. If yes and the capacitive power button is touched, then the capacitive button controller sends a logic 0 power button signal PWRBTN. If a capacitive button is touched but the touched button is not the capacitive power button, then the capacitive button controller enters the sleep state and the internal timer of the capacitive button controller is reset. The capacitive button controller determines whether the capacitive power button is touched. If so, then the flow proceeds to step 420. If no, then the flow proceeds to step 430.

In step 420, if the capacitive power button is touched, then the capacitive button controller sends the logic 0 power button signal PWRBTN to the system platform. In response to the logic 0 power button signal PWRBTN, if the previous state of the system platform is any of S3 (sleep state)/S4 (hibernate state)/S5 (power off state), then the system platform is woken up or powered on. In response to the logic 0 power button signal PWRBTN, if the previous state of the system platform is the power on state, then the system platform enters any of S3 (sleep state)/S4 (hibernate state)/S5 (power off state) according to the setting of the operating system.

In step 425, if the capacitive power button continues to be touched, then the capacitive button controller continues to transmit the logic 0 power button signal PWRBTN to the system platform. If the power button signal PWRBTN is in logic 0 state for longer than a predetermined time (such as 4 seconds), that is, the capacitive power button is touched for longer than a predetermined time, then the system platform is shut down.

In step 415, if the capacitive power button is not touched, or, in step 420, if the capacitive power button is already released, then the flow proceeds to step 430.

In step 430, the capacitive button controller sends a logic 1 power button signal PWRBTN to the system platform, and detects the system status signal SS from the system platform. If the system status signal SS is logic 1, then the capacitive button controller remains in the normal operation state (step 435). To the contrary, if the system status signal SS is logic 0, then the capacitive button controller enters the sleep state (step 440).

In step 445, when the capacitive button controller is in the normal operation state, it detects and/or reads the system status signal SS from the system. If the system status signal SS is logic 1, then the capacitive button controller remains in the normal operation state (step 435). To the contrary, if the system status signal SS is logic 0, then the capacitive button controller enters the sleep state (step 440).

As indicated in the above disclosure, in the second embodiment, the subsequent operation state of the system platform is determined by detecting whether the capacitive power button is pressed and whether the duration is longer than the predetermined time.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. An operation method for a computer system, comprising:
    detecting by a capacitive button controller whether a capacitive button group is touched;
    receiving a power button signal in a first logic state by a system platform and changing an operation state of the system platform if a capacitive power button of the capacitive button group is touched;
    shutting down the system platform if the capacitive power button is touched for longer than a predetermined time;
    receiving the power button signal in a second logic state by the system platform and determining a subsequent operation state of the system platform and the capacitive button controller according to a system status signal if the capacitive power button is touched for not longer than the predetermined time; and
    the capacitive button controller entering into a power saving state if the capacitive button group is touched but the capacitive power button is not touched; wherein
    the capacitive button controller and a micro-controller are awakened in response to a touch on the capacitive button group,
    the micro-controller determines whether the capacitive power button is touched,
    the capacitive button controller and the micro-controller enter the power saving state if the capacitive power button is not touched, and
    the micro-controller sends the power button signal in the first logic state to the system platform to change the operation state of the system platform if the capacitive power button is touched.

2. The operation method for a computer system according to claim 1, wherein,
    the capacitive button controller is awakened to write to an internal register in response to a touch on the capacitive button group; and
    the capacitive button controller sends an interrupt signal to the micro-controller to wake up the micro-controller.

3. The operation method for a computer system according to claim 1, wherein,
    when the capacitive button controller is in the power saving state, an internal timer of the capacitive button controller is in a normal operation state;
    the capacitive button controller is automatically awakened to detect whether the capacitive button group is touched if a set time of the internal timer is up;
    if so, then the capacitive button controller writes an internal register and sends an interrupt signal to the micro-controller to wake up the micro-controller; and
    if no, then the capacitive button controller enters the power saving state and the internal timer is reset.

4. The operation method for a computer system according to claim 1, wherein,
    after the micro-controller is woken up, the micro-controller reads an internal register of the capacitive button controller to determine whether the capacitive power button is touched.

5. The operation method for a computer system according to claim 1, wherein,
    the micro-controller sends the power button signal in the first logic state to the system platform if the capacitive power button is touched;
    the system platform is awakened or powered on in response to the power button signal in the first logic state if the system platform was in any of a sleep state, a hibernate state or a power off state; and
    the system platform enters any of the sleep state, the hibernate state or the power off state in response to the power button signal in the first logic state if the system platform was in a power on state.

6. The operation method for a computer system according to claim 1, wherein,
    the micro-controller reads an internal register of the capacitive button controller to check whether the capacitive power button is still touched;
    the micro-controller sends the power button signal in the second logic state to the system platform if the capacitive power button is already released;
    the micro-controller reads the system status signal from the system platform;
    the system platform enters any of a sleep state, a hibernate state and a power off state, and the capacitive button controller and the micro-controller enter the power saving state if the system status signal is in the first logic state; and
    the system platform enters a normal operation state if the system status signal is in the second logic state.

7. A computer system, comprising:
    a capacitive button controller for detecting whether a capacitive button group is touched;
    a system platform coupled to the capacitive button controller, wherein
        the system platform receives a power button signal in a first logic state and changes an operation state thereof if the capacitive button controller detects a capacitive power button of the capacitive button group is touched,
        the system platform is shut down if the power button is touched for longer than a predetermined time,
        the system platform receives a power button signal in a second logic state, and determines a subsequent operation state of the system platform and the capacitive button controller according to a system status signal if the capacitive power button is touched for not longer than the predetermined time, and
        the capacitive button controller enters a power saving state if the capacitive button group is touched but the capacitive power button is not touched; and
    a micro-controller coupled between the system platform and the capacitive button controller, wherein
        the capacitive button controller and the micro-controller are woken up in response to a touch on the capacitive button group,
        the micro-controller determines whether the capacitive power button is touched,
        the capacitive button controller and the micro-controller enter the power saving state if the capacitive power button is not touched, and the micro-controller sends the power button signal in the first logic state to the system platform to change the operation state of the system platform if the capacitive power button is touched.

8. The computer system according to claim 1, wherein,
the capacitive button controller is awakened to write to an internal register in response to a touch on the capacitive button group; and
the capacitive button controller sends an interrupt signal to the micro-controller to wake up the micro-controller.

9. The computer system according to claim 7, wherein,
an internal timer of the capacitive button controller is in a normal operation state when the capacitive button controller is in the power saving state;
the capacitive button controller is automatically awakened to detect whether the capacitive button group is touched if a set time of the internal timer is up;
if so, then the capacitive button controller writes an internal register and sends an interrupt signal to the micro-controller to wake up the micro-controller; and
if no, then the capacitive button controller enters the power saving state and the internal timer is reset.

10. The computer system according to claim 7, wherein,
the micro-controller reads an internal register of the capacitive button controller to determine whether the capacitive power button is touched after the micro-controller is woken up.

11. The computer system according to claim 7, wherein,
the micro-controller sends the power button signal in the first logic state to the system platform if the capacitive power button is touched;
the system platform is awakened or powered on in response to the power button signal in the first logic state if the system platform was in any of a sleep state, a hibernate state or a power off state; and
in response to the power button signal in the first logic state, if the system platform was in a power on state, then the system platform enters any of the sleep state, the hibernate state and the power off state.

12. The computer system according to claim 7, wherein,
the micro-controller reads an internal register of the capacitive button controller to check whether the capacitive power button is still touched;
the micro-controller sends the power button signal in the second logic state to the system platform if the capacitive power button is already released;
the micro-controller reads the system status signal from the system platform;
the system platform enters any of a sleep state, a hibernate state or a power off state and the capacitive button controller and the micro-controller enter into the power saving state if the system status signal is in the first logic state, then; and
the system platform enters a normal operation state if the system status signal is in the second logic state.

\* \* \* \* \*